United States Patent Office 3,070,765
Patented Dec. 25, 1962

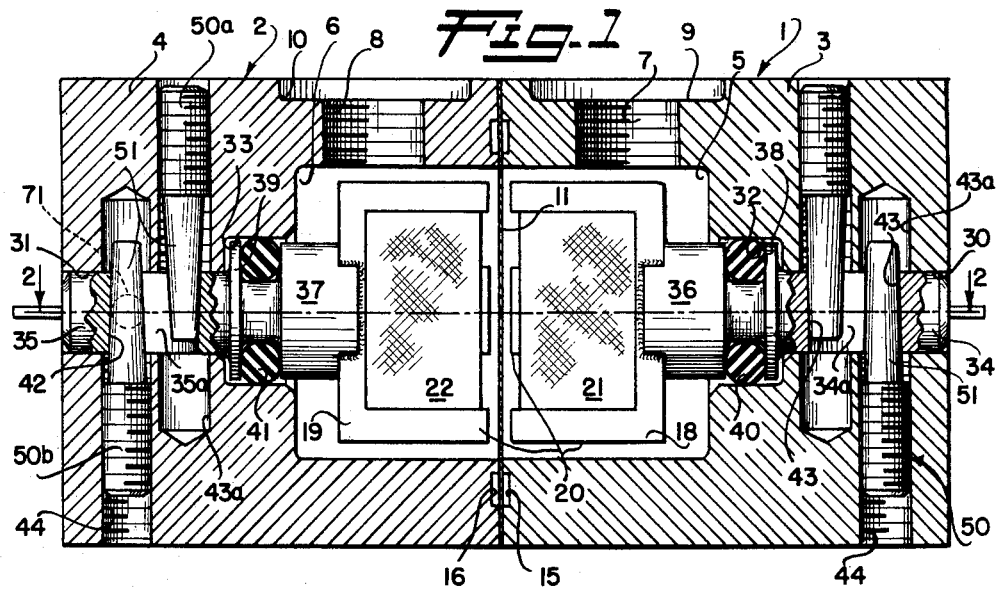

3,070,765
ADJUSTABLE VARIABLE RELUCTANCE PRESSURE TRANSDUCER
James W. Johansson, Panorama City, Calif., assignor to Lockheed Aircraft Corporation, Burbank, Calif.
Filed Sept. 5, 1958, Ser. No. 760,284
1 Claim. (Cl. 336—30)

This invention is directed generally to a metering device and more particularly to a pressure, temperature and acceleration sensitive transducer that is easily adjustable to cover a wide area of working ranges.

Transducers of this type are utilized where it is necessary to determine the pressure or temperature of a substance, usually gas or liquid, at a given point which would often be otherwise inaccessible, the device providing a means for translating the pressure reading into another energy system, usually electrical, which can be metered at a distance.

Various types of transducers have been developed utilizing, among others, variable reluctance and variable resistance principles. The present invention is directed to an improvement in the former type device known in the art as an E-core transducer but obviously would have equal adaptability with other types of transducer units.

In missile and other type instrumentation programs, changes are often made in physical parameters and ranges of operation after the basic programs have substantially progressed. In the particular case of pressure and accelerometer transducers, this means that considerable time and money must be expended in producing new equipment that would not only be compatible with the telemetering system employed but will be sensitive to and workable within the operating ranges specified. Also a change in a major specification often results in changes in the operating limits of a large number of supporting systems and the problem is thus multiplied until it becomes a major obstacle to the advancement of the project.

Most of these difficulties could logically be solved by the production of a transducer that is adjustable to operate over a wide choice of ranges. Various solutions to this problem have been proposed but each has been unacceptable due to instability, sensitivity to temperature extremes, and inability to operate constantly when subjected to shock cycles of temperature and vibration.

It is, therefore, a primary object of the present invention to provide a transducer that is easily and readily readjustable over a wide variety of pressure, temperature, and acceleration ranges.

Another object of the invention is to provide a single transducer that can be easily altered and calibrated over a wide range of physical perameters that will result in a great reduction of the number of types of such devices necessary to be kept in stock for research and industrial projects.

A further object of this invention is to provide a temperature, pressure and vibration stable transducer that can be adjusted without the necessity of completely disassembling the device.

An additional object of the present invention is to provide a pressure transducer that is readily adaptable to quantity manufacture that is provided with a novel means of accurately adjusting the sensitivity of the device at any desired point within a given range of response limits.

Additionally, it is an object of the invention to provide a novel means of positively locking a pressure, temperature and acceleration sensitive device at any point within a desired range of sensitivity.

With these and other objects in view, the invention will be described in detail in connection with the accompanying drawings wherein it will be seen that the principal modification shown is a transducer of the variable reluctance type having a circular, or other shaped, diaphragm armature. This armature is displaceable by applied pressure which results in changes in the distance of the air gap between the poles of the electromagnets and the diaphragm, this change in air gap being reflected as a change in inductance of an A.C. bridge circuit made up of the two transducer coils and two external resistors. Although two electromagnets are shown the invention may, of course, be utilized with single electromagnet units with electrically equivalent circuitry employed.

Referring in greater detail to the drawings, wherein like numerals denote like parts throughout, FIGURE 1 is a side elevational view shown in section on a line taken through the middle of the device;

FIGURE 2 is a top plan view in section taken on a line 2—2 of FIGURE 1;

FIGURE 3 is a side elevational sectional representation of one modification of the device;

FIGURE 4 illustrates in detail the electrical lead-through structure; and

FIGURE 5 is a sectional elevational representation of a modification of the invention used to measure temperatures and temperature variations.

Referring specifically to the sectional representation of FIGURE 1, the preferred embodiment of the transducer is shown composed of identical units or halves generally indicated at 1 and 2. It should be obvious that the objects of the invention would be fulfilled by providing a single unit assembly. However, such a single unit type transducer would not have the characteristics of linearity and accuracy provided with the double configuration. Each of the assemblies 1 and 2 respectively are composed of housings 3 and 4 having pressure chambers 5 and 6 therein. These pressure chambers are preferably cylindrical in shape but obviously may be of any other configuration. Providing for the entry of pressure into the chambers 5 and 6 are inlet ports 7 and 8. These inlet ports are preferably threaded, as shown, to receive the mating threads of inlet fittings, which may be sealed to the housings 1 and 2 by means of diaphragms or O-rings positioned in the inlet port cups 9 and 10.

Positioned between housing assemblies 1 and 2 is a flexible diaphragm 11 preferably metallic in nature and advantageously composed of the same type metal as the housings 3 and 4 in order to eliminate inaccuracies in operation due to different coefficients of expansion of the metals of the diaphragm and housing members. One metal which may advantageously be utilized in making these elements is Invar 36.

It should be noted that each of the housing members 3 and 4 have an annular groove 15 and 16 in their end faces. These grooves are to provide an area into which the diaphragm may expand as the housings are sealed together by means of long shank bolts 12 shown in FIGURE 2. It is often desirable in assembling the device to provide a plating of relatively soft metal such as tin, or the like, on the faces of housings 3 and 4 and, if desired, on the mating faces of diaphragm 11. As pressure is applied sealing the housings and the diaphragm together this softer metal will tend to flow into grooves 15 and 16 and any other interstices present in the interface areas to provide a hermetic seal. This type of seal has been utilized in transducers operating under pressures of over 3000 p.s.i.

Located within each of the pressure chambers 5 and 6 is an electrical sensing device, preferably an electromagnet type. In the preferred embodiment of the invention the sensing devices are E-core electromagnets so called because of the E-shaped configuration of the laminated core members 18 and 19 having poles 20. The center poles of each of the cores 18 and 19 is wrapped with a coil 21 and 22 having leads 24 more clearly shown in FIGURE 2.

Each of the housings 3 and 4 is provided with a passageway, 30 in housing 3, and 31 in housing 4, connecting pressure chambers 5 and 6 with the outer surfaces of the housings. Immediately adjacent pressure chambers 5 and 6 and connecting these chambers with the passageways 30 and 31 are enlarged intermediate chambers 32 and 33.

Slidably and adjustably journaled within passageways 30 and 31 are shafts 34 and 35 which are connected at their inner ends to the E-cores 18 and 19 respectively by welding, soldering, or the like.

These shafts 34, 35 are preferably made of a material which will longitudinally expand and provide for neutralizing the effects of temperature on the modulus of elasticity of the diaphragm material and in permeability of the magnetic core. Thus, for a given diaphragm thickness an increase in temperature will result in a difference in magnetic permeability of the core units and in the degree of flexibility (reflected by the change in modulus of elasticity) of the diaphragm and as temperatures go up the linearity of the unit with respect to electrical output would be seriously affected. By making the shafts of a material referred in the trade as "CRES 321/347" which is a stainless steel of the following composition: Chromium 17–19%, nickel 9–12%, carbon approximately .08%, manganese 2%, silicon 1%, sulfur .03%, phosphorus .04%, balance iron, the coefficient of expansion of the shafts will so regulate the thickness of the air gap between the diaphragm and the poles that the linearty of the unit is maintaind.

The portions of shafts 34 and 35 which extend within intermediate chambers 32 and 33 are provided with annular enlargements 36 and 37 immediately adjacent the E-cores 18 and 19 and thinner enlargements 38 and 39 positioned near the rear or outward walls of the intermediate chambers. These enlargements 38 and 39 are only slightly less than the diameter of intermediate chambers 32 and 33. Positioned between enlargements 36—38 and 37—39 are resilient O-rings 40 and 41 of rubber or the like, journaled on the shafts 34—35 between the respective enlargements thereon, pressing against the inner surface of the intermediate chambers 32—33 to provide an hermetic seal for pressure chambers 5 and 6. As shown, the peripheries of these openings into intermediate chambers 32—33 and passageways 30—31 are chamfered or rounded.

It should be noted that the diameters of passageways 30—31 and shaft members 34—35 positioned therein, are manufactured to a close tolerance in order that the E-cores connected to the shafts will not become upset or misadjusted due to vibration or the like. The E-cores, the pressure chambers 5 and 6, and shafts 34—35 are in substantial opposed alignment in this modification.

Proceeding now with a description of the adjustment feature of this invention, reference will be made to both FIGURES 1 and 2 wherein shafts 34—35 are provided with longitudinal slots or apertures 34a—35a. The ends of these slots are rounded as best seen in FIGURE 2 and these rounded end portions are also inclined slightly as shown at 42—43 in FIGURE 1 in order to more closely conform with the taper of the conical portions of the cams 50 described hereinbelow.

Located approximately transversely within housings 3 and 4 are opposed, offset passageways 43a which are provided throughout a substantial portion of their length with threads 44. Adjustably, threadably journaled within these passageways 43a are cam surfaces or taper-screws 50. These taper-screws are provided at their inner ends with a reduced, tapering, conical portion indicated at 51 upon each of screws 50. Mainfestly, as taper-screws 50 are advanced in passageways 43a, the conical or tapered portions 51 thereof will contact and slidably bear against the inclined end portions 43 of longitudinal apertures 34a—35a. The particular tapers or angle of inclinations of the ends from the vertical could obviously be varied within a wide range depending upon the degree of adjustment desired per unit turn of the screws 50. In the modification shown, a taper of approximately 3° has been found to be desirable.

As best shown in FIGURE 2, leads 24 are brought through the housings 3 and 4 and connected at the end surfaces thereof by means of conventional commercially available plugs shown generally at 60 and more specifically illustrated in FIGURE 4.

These plugs 60 are composed of metal plug members 61 which are soldered in place within housings 3 and 4 by means of a soldered joint shown at 62. Preferably placed within and soldered to plug 61 is an inner metallic tube 64 composed of a metal which will form a satisfactory bond with both glass and metal. Concentric with tube 64 is a second metallic tubular member 65 which is insulatingly sealed to tube 64 by means of glass or other suitable insulative material shown at 66, the tube 65 extending beyond the surface of housing 3 to form a binding post which electrical connection may be made.

*Operation*

In assembling the device for operation, the E-cores with the shafts 34—35 connected thereto are inserted in the pressure chambers in housings 3 and 4 respectively, with the shafts closely journaled within the passageways 30—31. Housings 3 and 4 are then assembled with a diaphragm 11 therebetween by means of screws 12 extending longitudinally of the housings at spaced points around the periphery thereof.

Screws 50 are threadably inserted within transverse passage ways 43a until they extend within the longitudinal slots in shaft members 34—35. Regarding each individual E-core, adjustment is made and a desired position set by the relative placements of opposed taper-screws 50 within the housing. Thus, advancing taper-screw 50a in FIGURE 1 will tend to move E-core 19 closer to diaphragm 11 provided the taper-screw 50b is backed off a suitable distance. Thus by operation of taper-screws 50 from the external surface of the transducer, extremely accurate adjustments may be made in the gaps between the poles of the laminated cores and the diaphragm 11.

It should be noted that an important feature of this configuration resides in the fact that pressure may be applied to the transducer while adjustments are being made by way of the set-screws 50.

These adjustments are usually very small and a change in the air gap of .01" will produce a change in electrical values sufficient to calibrate the transducer over a wide range.

The pressure chamber will remain hermetically sealed as the adjustments are made due to the particular configuration of the resilient O-rings within intermediate chambers 32—33. Although taper-screws are described above as a means of producing adjustment of the longitudinal position of shafts 34—35, it should be obvious that various other types of cam arrangements could be provided which would fall within the scope of this invention.

Referring to FIGURE 2, means has been provided to lock the adjustment of the transducer at a given position, this means being in the form of set-screws 70, threadably journaled within transverse openings 71 within housings 3 and 4.

FIGURE 3 shows a modification of this locking arrangement wherein the openings 71 and set-screw 70 are eliminated. In this modification, taper-screws 80 are provided which are similar in every respect to taper-screws 50, shown in connection with FIGURE 1, with the exception that the threaded shank is only approximately half as long. This taper-screw 80 is positioned within a transverse passageway 81 in the housing wall in a manner as shown in connection with FIGURE 1. The specific locking feature of this modification is provided by means of lock-screw 82 which is threadably inserted within passageway 81, concentrically and in alignment with taper-screw 80. Thus as lock-screw 82 is tightened down, it will bear against the end surface 83 of taper-screw 80 preventing movement of the same until lock-screw 82 is loosened. In this manner provision is made for securely locking the transducer for operation with a particular range setting.

In order to provide a wide variety of operating ranges within which the device is sensitive, provision has been made for easily removing and interchanging diaphragm 11. Thus, diaphragm 11 may be replaced with more or less flexible diaphragms depending upon the range of pressures to be metered, the less flexible diaphragms producing less change in gap for a given applied pressure.

In a similar manner the device may be operated as an accelerometer merely by providing a diaphragm of heavier mass or a diaphragm with a mass attached thereto which will be effected by changes in acceleration as the device is moved. Adjustment may be made in the same manner utilizing screws 50, thus providing a variation in sensitivity within a given range of operating limits depending upon the particular type of diaphragm employed.

FIGURE 5 shows a modification of the device as it is utilized as a temperature transducer. In this modification, identical in other respects to the unit shown in FIGURES 1 and 2, a bimetallic diaphragm or strip 90 is provided. The side of chambers 93 and 94 are apertured as at 97 and 98 to afford access to a connection operable in association with ports 94 and 95 to produce continuous current of fluid at a temperature which it is desired to measure. This modification may be used in connection with either the "cage" or "differential" type transducer assemblies. Thus as fluids of certain temperatures flow past and contact the bimetal element 90 the element becomes distorted due to the different coefficients of expansion of its two metals thus varying the gap between the element 90 and the poles 23 of the electromagnet assemblies.

There has thus been provided a sensitive and accurate transducer device which is adjustable from its outer surface. Manifestly, this particular configuration eliminates the difficulties involved in partially or completely disassembling the device as has been required heretofore. At the same time a versatile unit is produced which may be varied in sensitivity over a wide variety of ranges by a simple expedient of replacing the central diaphragm.

While certain preferred embodiments of the invention have been specifically disclosed, it is understood that the invention is not to be limited thereto as many variations will be readily apparent to those skilled in the art and the invention is to be given the broadest interpretation within the terms of the following claim.

I claim:

An adjustable variable reluctance pressure transducer comprising a pair of housings each having a pressure chamber therein, an interchangeable, flexible, diaphragm of the same metal as said housings positioned between said housings and hermetically sealed to each, said diaphragm constituting a wall common to each of said pressure chambers, an inlet port associated with each of said pressure chambers, an E-core electrical coil with external leads within each chamber with their poles in juxtaposition to said diaphragm, a passageway in the end of each of said housings, intermediate chambers connecting said pressure chambers with said passageways, a longitudinally slotted control shaft slidably journaled in each of said passageways and connected at their inner ends to said E-core coils, a resilient O-ring journaled on said shaft and sealingly engaged with the inner surface of said intermediate chamber, a pair of opposed externally accessible tapered cam shafts adjustably threadedly journaled in each of said housings with the tapered surfaces extending through said longitudinal slots, one shaft bearing against each end thereof, and locking set screws journaled in said housings with their inner ends engageable with said control shaft.

References Cited in the file of this patent

UNITED STATES PATENTS

| | | |
|---|---|---|
| 2,509,210 | Clark | May 30, 1950 |
| 2,581,359 | Clark | Jan. 8, 1952 |
| 2,683,989 | Clark | July 20, 1954 |
| 2,767,973 | Ter Veen | Oct. 23, 1956 |
| 2,814,312 | Booth et al. | Nov. 26, 1957 |
| 2,882,503 | Huff | Apr. 14, 1959 |
| 2,884,608 | Jessen | Apr. 28, 1959 |
| 2,927,290 | Baker | Mar. 1, 1960 |